(12) United States Patent
Imanari

(10) Patent No.: US 12,140,939 B2
(45) Date of Patent: Nov. 12, 2024

(54) PHYSICAL MODEL IDENTIFICATION SYSTEM

(71) Applicant: Toshiba Mitsubishi-Electric Industrial Systems Corporation, Tokyo (JP)

(72) Inventor: Hiroyuki Imanari, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 595 days.

(21) Appl. No.: 17/612,581

(22) PCT Filed: May 13, 2020

(86) PCT No.: PCT/JP2020/019135
§ 371 (c)(1),
(2) Date: Nov. 19, 2021

(87) PCT Pub. No.: WO2021/229727
PCT Pub. Date: Nov. 18, 2021

(65) Prior Publication Data
US 2022/0236725 A1  Jul. 28, 2022

(51) Int. Cl.
*G05B 19/418* (2006.01)
(52) U.S. Cl.
CPC ... *G05B 19/41885* (2013.01); *G05B 19/4183* (2013.01); *G05B 19/41835* (2013.01)
(58) Field of Classification Search
CPC .......................... G05B 13/0265; G05B 13/04; G05B 19/4183; G05B 19/41835;
(Continued)

(56) References Cited

U.S. PATENT DOCUMENTS

2006/0200261 A1* 9/2006 Monette ............. G05B 19/4183
700/115
2009/0143871 A1* 6/2009 Gao ....................... G05B 13/04
703/2
(Continued)

FOREIGN PATENT DOCUMENTS

CN     103955202 A     7/2014
CN     104504237 A     4/2015
(Continued)

OTHER PUBLICATIONS

Office Action issued on Nov. 9, 2023, in corresponding Korean patent Application No. 10-2021-7037564, 12 pages.
(Continued)

*Primary Examiner* — Kidest Bahta
(74) *Attorney, Agent, or Firm* — XSENSUS LLP

(57) ABSTRACT

A physical model identification system according to the present invention first uses actual data sampled from a manufacturing line to learn a statistical model expressing a controlled object in the manufacturing line. Next, this system creates numerical quantity data quantifying an input-output relationship between a registered input variable and a response variable of a learned statistical model. Next, this system identifies a correction coefficient of a physical model such that a relationship, expressed by the numerical quantity data, between the registered input variable and the response variable is maintained. An identified correction coefficient is reflected in the physical model implemented in a calculator controlling the manufacturing line. Accordingly, prediction precision of preset values and control values of the controlled object by a practical model is improved, and a stable operation of the manufacturing line and high quality production become possible.

5 Claims, 10 Drawing Sheets

(58) Field of Classification Search
CPC .... G05B 19/41885; G05B 9/00; G05B 11/00; G05B 15/00; G05B 19/00; G05B 23/00; G05B 99/00; G05B 6/00; G05B 17/00; G05B 2219/00
See application file for complete search history.

(56) References Cited

U.S. PATENT DOCUMENTS

| | | | |
|---|---|---|---|
| 2011/0202487 A1* | 8/2011 | Koshinaka | G06N 20/10 706/12 |
| 2014/0279746 A1 | 9/2014 | De Bruin et al. | |
| 2015/0379423 A1 | 12/2015 | Dirac et al. | |

FOREIGN PATENT DOCUMENTS

| | | | |
|---|---|---|---|
| CN | 105441610 A | | 3/2016 |
| CN | 110826024 A | | 2/2020 |
| JP | 2008-040660 A | | 2/2008 |
| JP | 2011-141798 A | | 7/2011 |
| JP | 2018-055299 A | | 4/2018 |
| JP | 2019-191836 A | | 10/2019 |
| KR | 20040043911 A | * | 5/2004 |

OTHER PUBLICATIONS

Andreas C. Müller et al., "Introduction to Machine Learning with Python", Oct. 2016, 392 pages.
Office Action issued on Nov. 24, 2021, in corresponding Taiwanese patent Application No. 109136688, 9 pages.
Office Action issued Dec. 21, 2022 in Indian Patent Application No. 202117052354, 6 pages.
Office Action issued on Feb. 1, 2024, in corresponding Chinese patent Application No. 202080037208.4, 13 pages.
International Search Report and Written Opinion mailed on Jul. 14, 2020, received for PCT Application PCT/JP2020/019135, Filed on May 13, 2020, with English translation 13 pages.
Office Action issued on Jun. 28, 2024, in corresponding Chinese patent Application No. 202080037208.4, 10 pages.
Office Action issued on Jul. 12, 2024, in corresponding Korean patent Application No. 10-2021-7037564, 7 pages.

* cited by examiner

| | MATERIAL-TO-BE-ROLLED TYPE 1 | | | ... | MATERIAL-TO-BE-ROLLED TYPE S | | |
|---|---|---|---|---|---|---|---|
| | STRIP THICKNESS 1 | ... | STRIP THICKNESS T | ... | STRIP THICKNESS 1 | ... | STRIP THICKNESS T |
| COOLING WATER TEMPERATURE (LOW) | | | | | | | |
| ... | | | | | | | |
| COOLING WATER TEMPERATURE (HIGH) | | | | | | | |

FIG. 8

PHYSICAL MODEL IDENTIFICATION SYSTEM

CROSS-REFERENCE TO RELATED APPLICATION

The present application is based on PCT filing PCT/JP2020/019135, filed May 13, 2020, the entire contents of which are incorporated herein by reference.

FIELD

The present invention relates to a physical model identification system.

BACKGROUND

An automatic control system for controlling a manufacturing line manufacturing industrial products has been known. The automatic control system enables automatic preset and real-time control for a controlled object in a manufacturing line.

The automatic control system has a model defined for a manufacturing facility and a manufacturing process as controlled objects for preset and control. The automatic control system calculates preset values and calculates control gains based on predictive calculation by the model and applies those calculated values to the manufacturing line.

Thus, an improvement in prediction precision of preset values and control values by improving precision of a model is important for a stable operation of a manufacturing line and production of high quality products.

CITATION LIST

Patent Literature

[PTL 1] JP 2019-191836 A

SUMMARY

Technical Problem

In order to improve model precision, studies have been made on usage of a statistical model as a model implemented in a control system. A statistical model is a data driven model needing a large amount of actual data (measured data) for system identification and is an inductive model. A main purpose of a statistical model is to quantify the strength of a relationship between variables while the relationship between variables is assumed and to express an object by a numerical value. A statistical model is a model expressed by a set of relational expressions among variables. For learning of a statistical model, the method of least squares represented by a regression analysis, machine learning represented by a neural network, or the like is used.

However, in application of a statistical model as a model implemented in a control system, the following problems are present.

First, for system identification of a statistical model using a regression analysis or machine learning, a large amount of actual data in an operating manufacturing line are necessary. Thus, a statistical model may not be applied to a new manufacturing line having no actual data.

Second, in a case where a change is made in a portion of a controlled object such as a manufacturing facility, actual data have to be again obtained, and a statistical model has to be relearned.

With regard to this point, PTL 1 discloses that in a case where a fluctuation occurs to a characteristic of a monitored object in machine learning of an abnormality detection system, a model parameter of the monitored object is relearned without stopping an action of the abnormality detection system. However, an application object is limited to linear state-space models. However, in manufacturing facilities and manufacturing processes, not many objects are present which may be described by a linear model. Thus, a model is desired to be applicable to non-linear models.

Third, when a value outside a predetermined range (outside the range of the minimum value to the maximum value) is input to a statistical model, calculation precision of a predicted value (calculated value) by the statistical model largely degrades. Thus, stability of preset and control of a control system implementing a statistical model is not sufficient.

In order to avoid such problems, a physical model is considered to be appropriate as a model implemented in a control system. A physical model is a deductive model that extracts essential properties of a physical phenomenon in a controlled object and expresses those by mathematical formulas.

On the other hand, it is not easy to appropriately decide model coefficients included in a physical model from the beginning. Further, changes in a manufacturing facility over time also influence the model coefficients. Thus, it is desired that precision of a physical model be enhanced by using actual data acquired during running of the manufacturing line and calculation precision of preset values and control values be enhanced.

This invention has been made to solve the above-described problems. An object of this invention is to provide a physical model identification system that may use actual data to improve model precision of a physical model for calculating preset values and control values applied to a controlled object.

Solution to Problem

To achieve the above object, a physical model identification system according to the present invention is configured as follows.

A physical model identification system according to this invention includes: a calculator; a data sampling device; and a physical model identification device.

The calculator calculates a preset value and a control value, the preset value and the control value being applied to a controlled object, by using a physical model expressing a physical phenomenon in the controlled object including a manufacturing facility and a manufacturing process by a mathematical formula. The physical model expresses an input-output relationship between plural input variables and at least one response variable by a mathematical formula including a correction coefficient. The correction coefficient is one kind of model coefficient.

The data sampling device samples plural sets of process data as control results of the controlled object based on the preset value and the control value, the preset value and the control value being calculated by the calculator. Each of the plural sets of process data includes values of the plural input variables and values of the response variable.

The physical model identification device identifies the physical model based on the plural sets of process data.

The physical model identification device includes: a data edition unit; a statistical model learning unit; a model validity verification unit; a relationship specifying unit; a model coefficient identification unit; and a model coefficient setting unit.

The data edition unit separates remaining data resulting from removal of abnormal data from the plural sets of sampled process data into data for learning and data for verification. For example, the abnormal data are process data in which a value of at least one input variable does not fluctuate among the plural sets of continuous process data or are process data in which at least one input variable fluctuates a threshold value or more among the plural sets of continuous process data.

The statistical model learning unit uses the data for learning to inductively learn a statistical model expressing the input-output relationship between the plural input variables and the response variable for the controlled object. For example, the statistical model is a model obtaining a function expressing the input-output relationship between the plural input variables and the response variable by using a method of least squares or a model obtaining the input-output relationship by using machine learning. Here, the plural input variables and the response variable in the statistical model are the same as the plural input variables and the response variable in the physical model.

The model validity verification unit verifies validity of the learned statistical model by using the data for verification.

In one preferable aspect, the learned statistical model is determined to be valid in a case where the difference between an error A based on the data for learning and an error B based on the data for verification is within a threshold value. Here, the error A is an error between a calculated value of the response variable, the calculated value being output in a case where a value of the input variable, the value being included in the data for learning, is input to the learned statistical model, and an actual value of the response variable, the actual value being included in the data for learning. The error B is an error between a calculated value of the response variable, the calculated value being output in a case where a value of the input variable, the value being included in the data for verification, is input to the learned statistical model, and an actual value of the response variable, the actual value being included in the data for verification.

The relationship specifying unit uses the learned statistical model to create numerical quantity data quantifying an input-output relationship between at least one registered input variable included in the plural input variables and the response variable in a case where the learned statistical model is valid. The registered input variable is an input variable whose relationship with the response variable is desired to be quantified.

The model coefficient identification unit identifies the correction coefficient of the physical model such that calculated values match values of the response variable which are included in the numerical quantity data, the calculated values being outputs of the physical model in a case where values of the registered input variable which are included in the numerical quantity data are set as inputs to the physical model.

In one preferable aspect, the numerical quantity data are a numerical value table describing a relationship between the registered input variable and the response variable or a function approximating the relationship.

The model coefficient setting unit sets the identified correction coefficient for the physical model implemented in the calculator.

Advantageous Effects of Invention

In this invention, a statistical model expressing a controlled object may be learned by using actual process data. Further, a correction coefficient of a physical model implemented in a calculator may be updated by using a learned statistical model. Accordingly, model precision of the physical model may be improved, and prediction precision of preset values and control values may be improved. As a result, a stable operation of a manufacturing line and high quality production become possible.

BRIEF DESCRIPTION OF DRAWINGS

FIG. 8 is a diagram illustrating one example of a numerical value table.

DESCRIPTION OF EMBODIMENTS

Embodiments of the present invention will hereinafter be described in detail with reference to drawings. However, in a case where numbers such as number, numerical quantity, amount, and range of each element are mentioned in the embodiments described in the following, the present invention is not limited to the mentioned numbers except a case where the numbers are particularly and clearly indicated or a case where an embodiment is obviously specified by the numbers in principle. Further, structures and so forth explained in the embodiments described in the following are not necessarily required for this invention except a case where the structures and so forth are particularly and clearly indicated or a case where an embodiment is obviously limited to those in principle.

First Embodiment

<System Configuration of Manufacturing Line>

Figure 1:
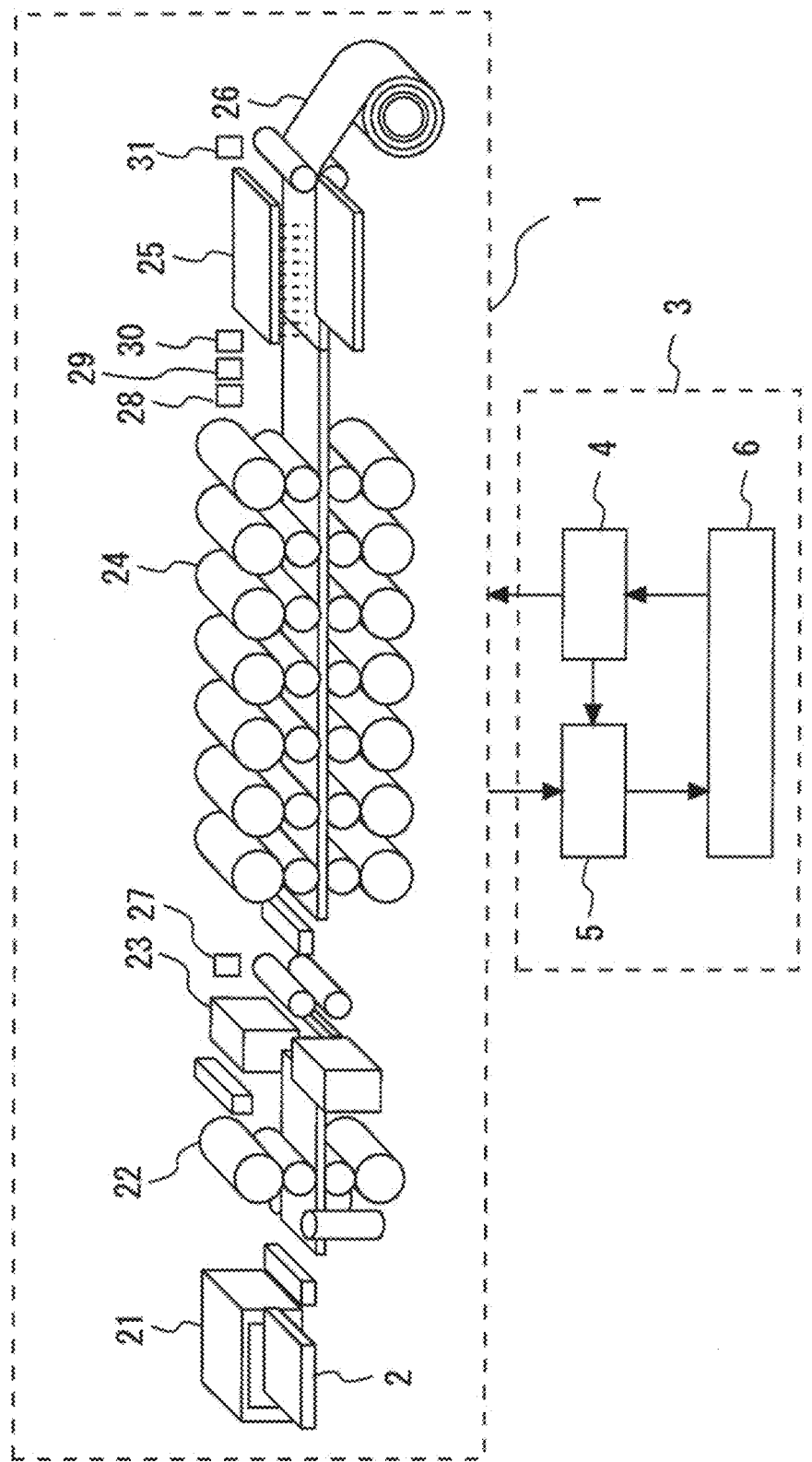
FIG. 1 is a schematic diagram illustrating a system configuration of a manufacturing line according to a first embodiment.

FIG. 1 is a schematic diagram for explaining a system configuration of a manufacturing line according to a first embodiment. A rolling line 1 is one example of the manufacturing line. The rolling line 1 illustrated in FIG. 1 is a hot strip rolling line. The rolling line 1 includes a heating furnace 21, a roughing mill 22, an edge heater 23, a finishing mill 24, a run-out table 25, and a coiler 26 as main manufacturing facilities. A material-to-be-rolled 2 is processed into predetermined strip thickness and strip width, cooled, and coiled in a coil shape by those facilities.

The heating furnace 21 heats the material-to-be-rolled 2. The roughing mill 22 rolls the heated material-to-be-rolled 2. The roughing mill 22 is configured with one to three roughing mills, for example. The edge heater 23 is provided downstream of the roughing mill 22 and heats width-direction edge portions of the material-to-be-rolled 2.

The finishing mill 24 is provided downstream of the edge heater 23. The finishing mill 24 includes plural rolling stands and rolls the material-to-be-rolled 2 in one direction from an upstream portion to a downstream portion. A final quality about the sizes such as strip thickness and strip width of the material-to-be-rolled 2 is decided by the finishing mill 24.

The run-out table 25 is provided downstream of the finishing mill 24 and pours water to the material-to-be-rolled 2. The coiler 26 is provided downstream of the run-out table 25 and coils the cooled material-to-be-rolled 2 in a coil shape.

The rolling line 1 includes a control system controlling each of the facilities. The control system includes a sensor provided in each position of the manufacturing line, an actuator driving each of the facilities, a controller for controlling the actuator, a calculator 4 outputting a preset value and a control value to the controller.

The sensors include a finishing mill entry-side pyrometer 27, a strip thickness meter 28, a strip width meter 29, a finishing mill delivery-side pyrometer 30, and a coiler entry-side pyrometer 31, for example. The actuators include electric motors for driving the rolling stands and a water-pouring valve and pump configuring the run-out table 25, for example.

<Physical Model Identification System>

Figure 2:
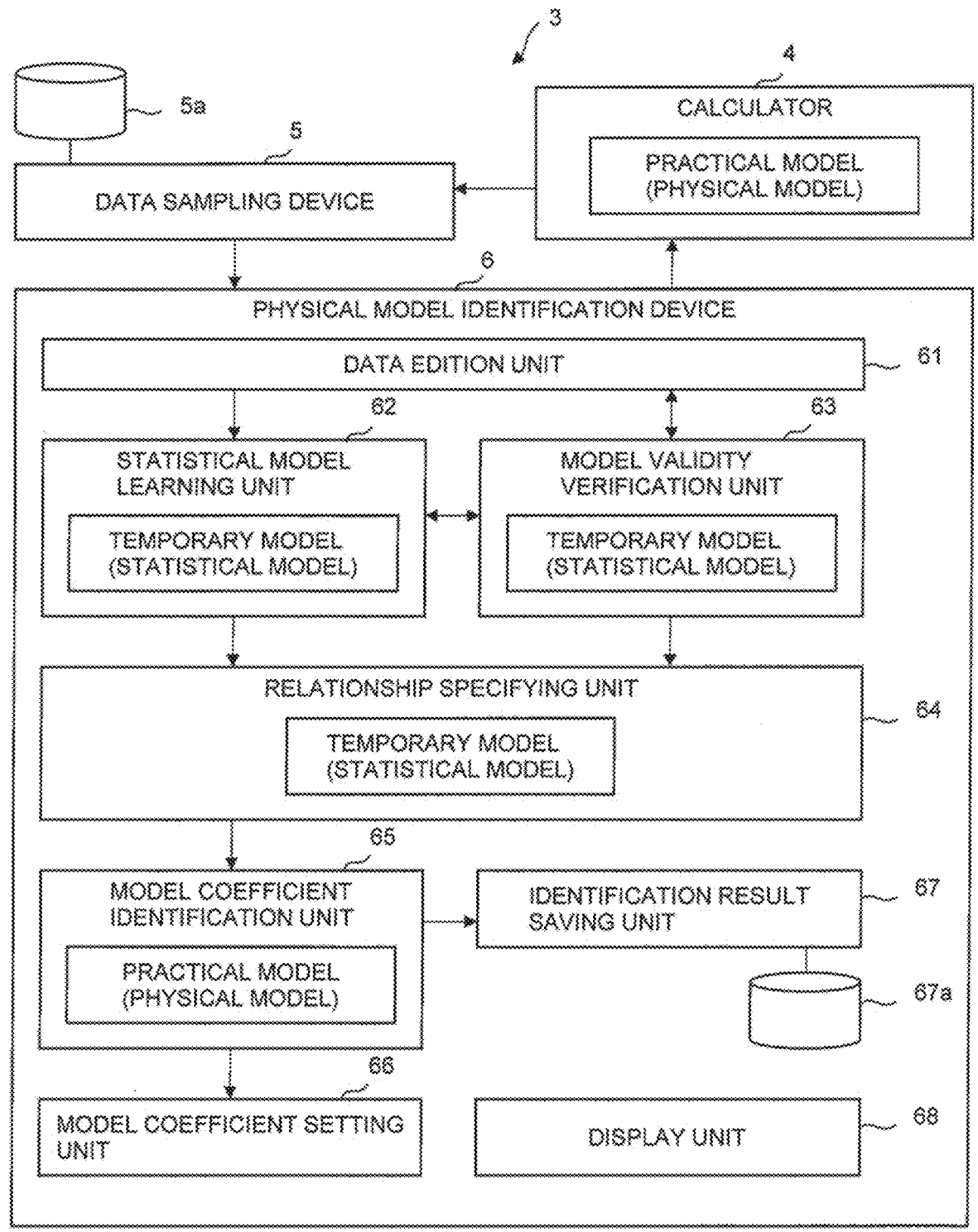
FIG. 2 is a block diagram for explaining a physical model identification system.

FIG. 2 is a block diagram for explaining a physical model identification system 3. The physical model identification system 3 may be included in the above-described control system.

The physical model identification system 3 updates a correction coefficient (one kind of model coefficient) of a practical model implemented in the calculator 4 based on actual data (measured data) sampled from the manufacturing line and enhances precision of preset values and control values for which predictive calculation is performed by the practical model.

The physical model identification system 3 includes the calculator 4, a data sampling device 5, and a physical model identification device 6.

The physical model identification system 3 has two kinds of models that express the input-output relationship between plural input variables and at least one response variable about the same controlled object by different definitions. The two kinds of models are a practical model and a temporary model.

The practical model is a physical model implemented in the calculator 4 and used for calculating preset values and control values set for the controlled object. The temporary model is a statistical model that is temporarily used for identifying the correction coefficient of the practical model based on the actual data in the physical model identification device 6.

The calculator 4 implements the practical model expressing the controlled object and calculates the preset values and control values applied to the controlled object by using the practical model. The controlled object includes the manufacturing facilities and manufacturing processes of the manufacturing line. The practical model is a physical model that extracts essential properties of a physical phenomenon in the controlled object and expresses those by a mathematical formula. The physical model expresses the relationship between plural input variables and at least one response variable by a mathematical formula including the correction coefficient.

In this embodiment, a coiling temperature model for controlling a coiling temperature of the material-to-be-rolled 2 in the rolling line 1 will be described as a specific example. Thus, in the following description, the practical model (physical model) and the temporary model (statistical model) are about the coiling temperature model.

A description will be made about a specific example of a practical model expressing the coiling temperature model.

The practical model used for preset and control of the controlled object is described as formula (1). A unit resulting from division of the material-to-be-rolled 2 from an FDT measurement position to a CT measurement position into certain virtual lengths will be referred to as segment. Formula (1) is a temperature calculation formula about one segment. The second term of the right side of formula (1) denotes a temperature drop amount in movement of one segment from the FDT measurement position to the CT measurement position.

[Math. 1]

$$CT = FDT - \sum_{i=1}^{N_{sec}} \left( \frac{1}{n} \sum_{k=1}^{n} \Delta T_k(i) \right) \quad (1)$$

Here,

CT: coiler entry-side temperature (strip-thickness direction average temperature) [° C.]

FDT: finishing-mill delivery-side temperature (strip-thickness direction average temperature) [° C.]

$N_{sec}$: the number of sections for dividing the material-to-be-rolled 2 in a conveyance direction (i=1 means the FDT measurement position and i=$N_{sec}$ means the CT measurement position)

n: the number of division for dividing the material-to-be-rolled 2 in the strip thickness direction (k=1 means an upper surface portion of the material-to-be-rolled 2 and k=n means a lower surface portion of the material-to-be-rolled 2)

A term $\Delta T_k$ of formula (1) denotes the temperature change of the kth microvolume portion resulting from division of the material-to-be-rolled 2 in the strip thickness direction and is described as formula (2). Further, a term $\Delta T_k(i)$ of formula (1) denotes a temperature drop amount of a node number k in a position i on the ROT and denotes a temperature drop amount in movement of the segment from an entry side to a delivery side of the position i.

[Math. 2]

$$\Delta T_k = \frac{\sum Q_k}{\rho C_p V_k} \Delta t \quad (2)$$

Here, $\rho$: density of cooled body [kg/mm$^3$]

$C_p$: specific heat of cooled body [J/kg/deg]

$V_k$: kth microvolume [mm$^3$]

Δt: time change [s]

ΣQ: sum of heat flow [J/s] or [W]

Formula (2) is a basic formula for calculation by a finite difference method. As causes of heat flow Q, water-cooling heat transfer on a surface of the material-to-be-rolled, heat transfer due to air-cooling convection, and heat transfer due to radiation may be raised. Further, heat conduction in an internal portion of the material-to-be-rolled and phase transformation heat generation may also be raised.

Here, an influence of a cooling water temperature will further be discussed. As for cooling water in a rolling mill, filtration of water once used for cooling, lowering of the temperature by exposition to outside air, and reuse for cooling the material-to-be-rolled are repeated. Thus, the temperature of the cooling water is not constant but is different due to fluctuations over seasons and geographical conditions of the rolling mill. In general, when the cooling water temperature is lower, the material-to-be-rolled is more strongly cooled. Heat flow $Q_W$ due to water-cooling heat transfer is expressed by formula (3).

[Math. 3]

$$Q_W = h_W A_W (T_S - T_W) \qquad (3)$$

Here, $h_W$: heat transfer coefficient between cooled body and cooling water (water-cooling heat-transfer coefficient) [W/mm²/° C.]

$A_W$: surface area of cooled body [mm²]

$T_S$: surface temperature of cooled body [° C.]

$T_W$: cooling water temperature [° C.]

In formula (3), although $T_S$ is 500° C. to 600° C., the cooling water temperature $T_W$ is approximately 20° C. to 30° C. Thus, the value of $T_S - T_W$ is mostly decided by $T_S$. However, in reality, it is generally accepted that the influence of the cooling water temperature is greater than formula (3). Further, it is difficult to highly precisely define the value of a water-cooling heat-transfer coefficient $h_W$ that changes in accordance with conditions. Thus, the heat flow $Q_W$ due to water-cooling heat transfer is expressed by formula (4) resulting from correction of formula (3).

[Math. 4]

$$Q_W = C_W h_W A_W (T_S - T_W) \qquad (4)$$

Here, $C_W$: correction coefficient by cooling water temperature

Next, the data sampling device 5 will be described.

The data sampling device 5 samples plural sets of process data as control results of the controlled object based on the preset values and control values calculated by the calculator 4. The process data are actual data (measured data) which are sampled from the sensors, the controllers, and the calculator 4 in an actual operation of the manufacturing line and to which sampling times are added. The data sampling device 5 records sampled time-series process data in a recording device 5a. Each of the plural sets of process data includes values of plural input variables and values of at least one response variable, the plural input variables and at least one response variable being defined in the practical model (physical model).

Next, the physical model identification device 6 will be described.

The physical model identification device 6 identifies the practical model based on plural sets of process data. First, the physical model identification device 6 learns the temporary model based on the plural sets of process data as the actual data of the manufacturing line input from the data sampling device 5. Next, the physical model identification device 6 identifies the correction coefficient of the practical model based on numerical quantity data that quantify the input-output relationship of the temporary model. In addition, the physical model identification device 6 sets the correction coefficient for the practical model of the calculator 4.

A more detailed description will be made. The physical model identification device 6 includes a data edition unit 61, a statistical model learning unit 62, a model validity verification unit 63, a relationship specifying unit 64, a model coefficient identification unit 65, a model coefficient setting unit 66, an identification result saving unit 67, and a display unit 68.

The data edition unit 61 separates the remaining data resulting from removal of abnormal data from plural sets of sampled process data into data for learning and data for verification.

Figure 3:
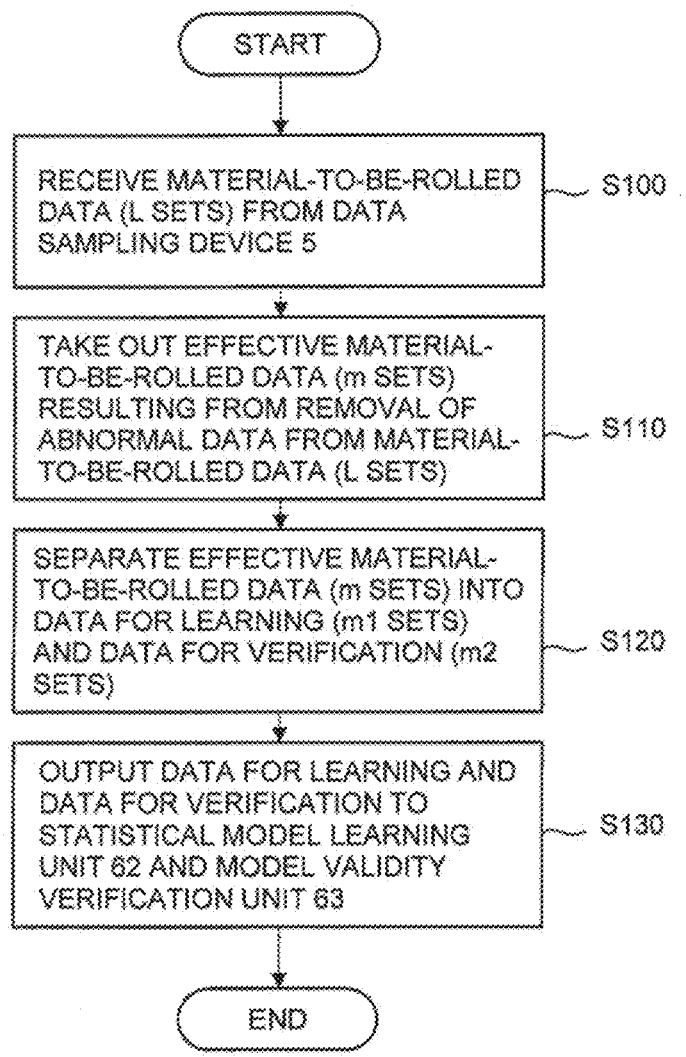
FIG. 3 is a flowchart for explaining a processing example of a data edition unit.

FIG. 3 is a flowchart for explaining a processing example of the data edition unit 61.

In step S100, the physical model identification device 6 receives L sets of material-to-be-rolled data from the data sampling device 5. The material-to-be-rolled data are one example of the above-described process data and are actual data necessary for identification of a model. The material-to-be-rolled data for every material-to-be-rolled include items indicating a specification, a standard, a target value, and so forth of the material-to-be-rolled 2, data items indicating attributes such as specifications of rolling rolls, and time-series data items such as a roll force and a torque in a facility used for the rolling.

In step S110, effective material-to-be-rolled data (m sets, m≤L) resulting from removal of abnormal data are taken out from the L sets of material-to-be-rolled data. The abnormal data are data having trouble with learning or verification. The abnormal data include data in a case where abnormal rolling is performed such as rolling stopped on the way. Further, even in a case where normal rolling is performed, the abnormal data include data that have an item in which a fixed value such as zero is placed or a largely oscillating item. The abnormal data are removed because the abnormal data become a cause of lowering of precision for a regression analysis or machine learning.

In step S120, the effective material-to-be-rolled data (m sets) are separated into the data for learning (m1 sets) and the data for verification (m2 sets). Note that the data for learning are more than the data for verification (m1>m2).

In step S130, the data for learning and the data for verification are output to the statistical model learning unit 62 and the model validity verification unit 63. The data for learning and the data for verification are the process data, and as described above, plural input variables and at least one response variable are defined for the process data.

Here, a description will be made about input variables V and a response variable O in the coiling temperature model with reference to FIG. 4.

The coiling temperature model in this embodiment is a model that is used for controlling the coiling temperature (coiler entry-side temperature) of the material-to-be-rolled 2 rolled by the finishing mill 24 by pouring water on the run-out table 25 (ROT 25). The coiling temperature model is a model expressing the input-output relationship between the input variables V and the response variable O.

In a case where the coiling temperature model is identified, the input variables V include the strip thickness of the material-to-be-rolled 2, a speed of the material-to-be-rolled 2 on the ROT 25, the temperature of material-to-be-rolled 2 on an entry side of the ROT 25, the temperature of the material-to-be-rolled 2 in each position on the ROT 25, a poured water amount in each position on the ROT 25, the cooling water temperature, and so forth. The response variable O includes the coiling temperature.

Next, the statistical model learning unit 62 will be described.

The statistical model learning unit 62 uses the m1 sets of data for learning to inductively learn the temporary model expressing the input-output relationship between plural input variables and at least one response variable for the controlled object. As described above, the temporary model (statistical model) is the coiling temperature model expressing the same controlled object as the practical model (physical model) by a different definition and has the same input variables and response variable as the practical model.

As methods used for learning of the temporary model as a statistical model, a method using the method of least squares represented by a regression analysis, a method using machine learning represented by a neural network are raised.

In the regression analysis, a response variable y and input variables $x_1, x_2, \ldots, x_n$ are used, and the regression formula is expressed by formula (5).

[Math. 5]

$$y = a_0 + a_1 x_1 + a_2 x_2 + a_3 x_3 + \ldots + a_n x_n \quad (5)$$

Here, $a_0, a_1, a_2, \ldots, a_n$ denote regression coefficients and denote coefficients deciding the input-output relationship. In the regression analysis, formula (5) itself denotes the temporary model.

The neural network includes an input layer, intermediate layers, and an output layer. The intermediate layers are configured with at least one layer. In general, a neural network is learned by an algorithm referred to as backpropagation while data for learning are used as samples. In this learning algorithm, values of input variables are input to the input layer, and weights of connection between each of the layers are corrected little by little such that the value of the output layer matches the value of the response variable. In the neural network, the temporary model is expressed by configurations of the input layer, the intermediate layers, and the output layer and by the values of weights of connection among those.

A description will be made about a reason why the temporary model expressed by a statistical model is used in order to identify the practical model expressed by a physical model in this embodiment.

With regard to formula (4) of the above-described physical model, a graph will be discussed in which the cooling water temperature $T_W$ is set as the horizontal axis and the heat flow $Q_W$ is set as the vertical axis. Referring to this graph, it may intuitively (qualitatively) be understood that when the cooling water temperature $T_W$ becomes higher, the heat flow $Q_W$ becomes smaller. However, it is difficult to quantitatively describe this physical model. That is, it is difficult to decide the optimal correction coefficient $C_W$. One factor is that although the coiling temperature model includes various amounts of the physical model as described above, measurable temperatures are only temperatures by pyrometers placed on an entry side and delivery side of the ROT, and measurement conditions are thus considerably restricted.

On the other hand, in the temporary model as a statistical model, on the assumption that sufficient data for learning are present, it is not difficult to make the relationship between the cooling water temperature as one of the input variables and the coiling temperature as the response variable become apparent. For example, in formula (5), when the cooling water temperature is set as $x_3$, a regression coefficient of $a_3$ is obviously present between the cooling water temperature and a coiling temperature y. In a case of the neural network, when the cooling water temperature is set as the third input variable and the cooling water temperature is changed, the coiling temperature as the response variable obviously changes. In other words, the temporary model is a statistical model that directly describes the input-output relationship between the input variables and the response variable without getting through formula (3) or formula (4).

Accordingly, in this embodiment, the practical model expressed by a physical model is identified by using the temporary model expressed by a statistical model.

Next, the model validity verification unit 63 will be described.

The model validity verification unit 63 verifies the validity of a learned statistical model by using the data for verification. Here, the learned statistical model is a temporary model (regression learning model or neural network model) that has learned the input-output relationship illustrated in FIG. 4 between plural input variables V and at least one response variable O by the statistical model learning unit 62.

Figure 5:
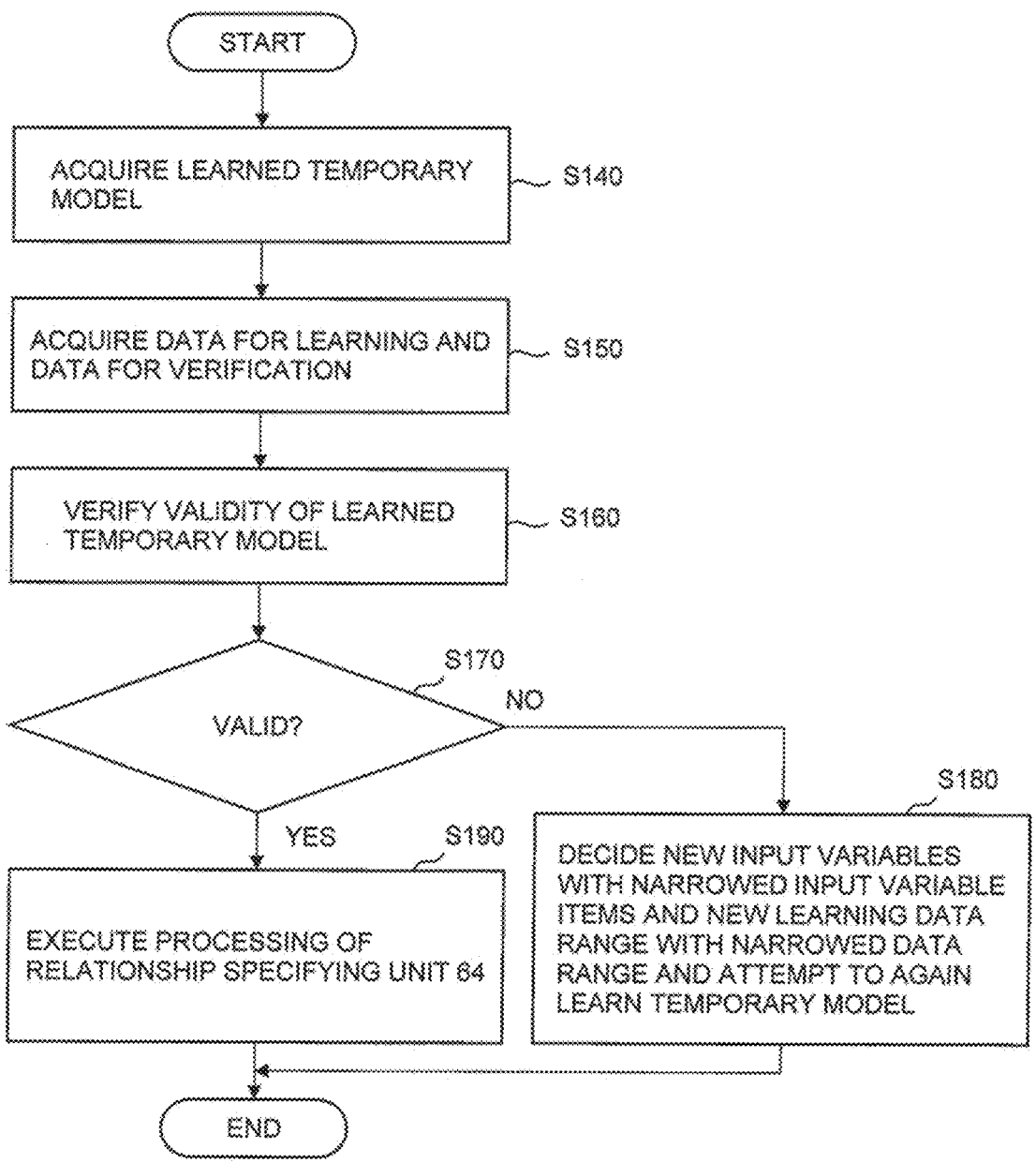
FIG. 5 is a flowchart for explaining a processing example of a model validity verification unit.

FIG. 5 is a flowchart for explaining a processing example of the model validity verification unit 63.

In step S140, the model validity verification unit 63 acquires a learned temporary model from the statistical model learning unit 62.

In step S150, the model validity verification unit 63 acquires the data for learning and the data for verification from the data edition unit 61.

In step S160, the model validity verification unit 63 verifies the validity of the learned temporary model. The model validity verification unit 63 inputs input variables of the data for verification to the learned temporary model and calculates the values of a response variable. Because actual values of the response variable are also included in the data for verification, the model validity verification unit 63 may compare the calculated values with the actual values of the response variable.

The model validity verification unit 63 determines that the learned temporary model is valid in a case where the difference between an error A based on the data for learning and an error B based on the data for verification is within a threshold value. Here, the error A is an error between the calculated value of the response variable which is output in a case where a value of the input variable which is included in the data for learning is input to the learned temporary model and an actual value of the response variable which is included in the data for learning. Here, the error B is an error between the calculated value of the response variable which is output in a case where a value of the input variable which is included in the data for verification is input to the learned temporary model and the actual value of the response variable which is included in the data for verification.

Indices for comparison may include: a value obtained by dividing the sum of the squared values of errors between calculated values and actual values by the number of sets of data; a value obtained by dividing the sum of the squared values of values, the values resulting from division of errors between the calculated values and the actual values by the actual values, by the number of sets of data; a value obtained by dividing the sum of the absolute values of errors between the calculated values and the actual values by the number of sets of data; a value obtained by dividing the sum of the absolute values of values, the values resulting from division of errors between the calculated values and the actual values by the actual values, by the number of sets of data; and so forth.

In general, the error A based on the data for learning is smaller than the error B based on the data for verification. Such a tendency appears because learning is performed in learning such that errors of the data for learning are minimized but the data for verification are different from the data for learning. Thus, it is difficult to expect model precision in the statistical model learning unit 62 in verification. Here, it is accepted that the temporary model is valid when the error in verification is within approximately n times the error in learning. Here, it is sufficient that n is greater than one, and n is two, for example.

In step S170, the model validity verification unit 63 moves to a process of step S180 in a case where the temporary model is assessed to be not valid but moves to a process of step S190 in a case where the temporary model is assessed to be valid.

In a case where the temporary model is not valid, in step S180, the physical model identification device 6 reduces the number of input variables and decides new input variables. Alternatively, the physical model identification device 6 may decide new data for learning in which a selection range of the data for learning is narrowed. For example, priority is in advance defined for plural input variables, variables of low priority are removed, and the number of input variables may thereby be reduced. Further, data including a large number of zeros or fixed values, for example, compared to the other sets of data are removed from the data for learning, and the number of sets of data may thereby be reduced.

The physical model identification device 6 attempts to again learn the temporary model by using the new data (the data edition unit 61 and the statistical model learning unit 62). Accordingly, although a model application range becomes narrow, the model precision is likely to be improved.

Note that in a case where the number of repetitions of relearning the temporary model exceeds the maximum value, the physical model identification device 6 suspends an attempt and accepts a continuation instruction or a stop instruction by an operator.

Processing of the relationship specifying unit 64 in step S190 will be described later with reference to FIG. 6.

The relationship specifying unit 64 derives a direct relationship between input variables and an output variable in the temporary model. Specifically, in a case where the learned temporary model is valid, the relationship specifying unit 64 uses the learned temporary model to create numerical quantity data that quantify the input-output relationship between at least one registered input variable included in plural input variables and at least one response variable.

Figure 6:
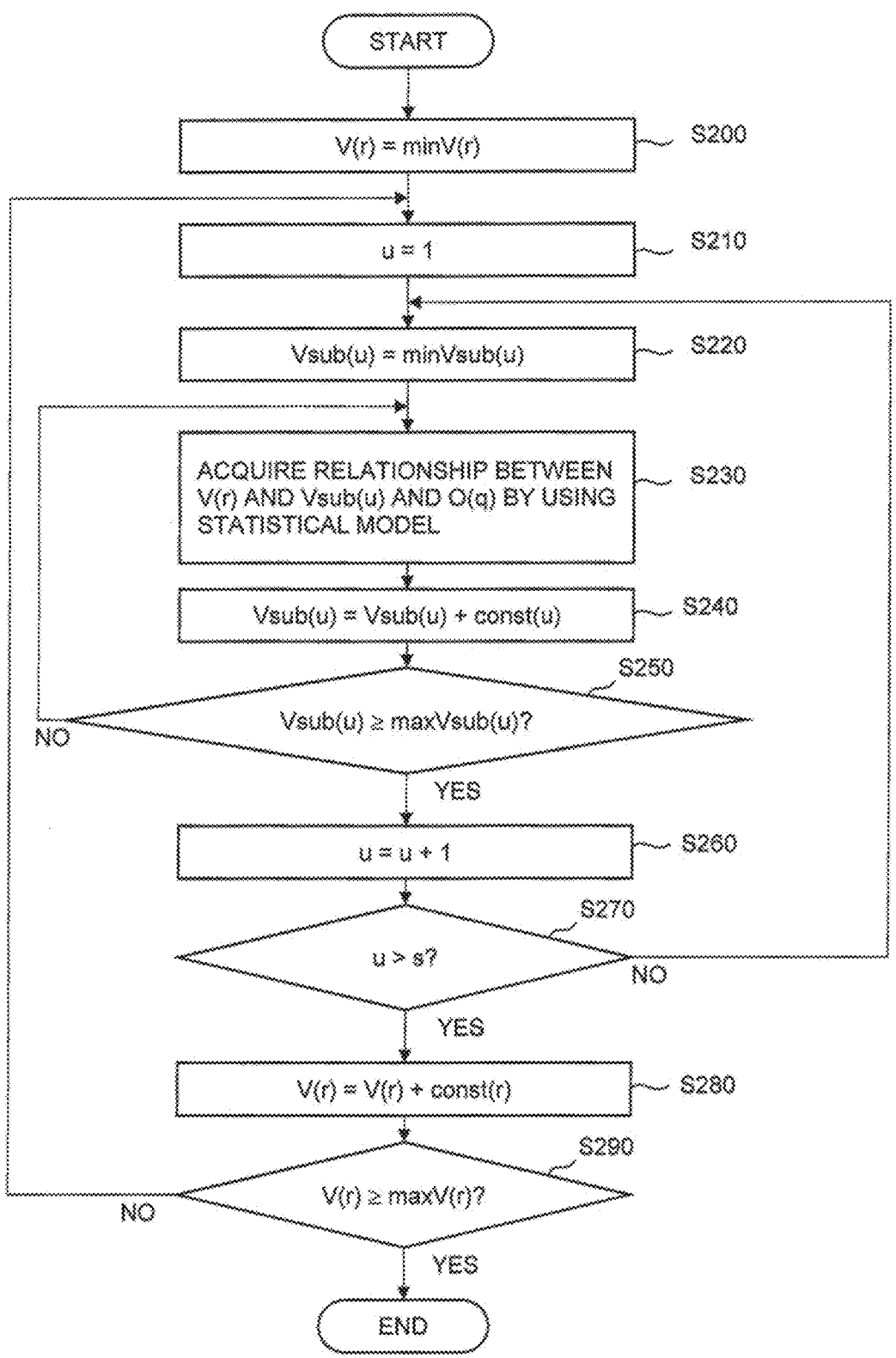
FIG. 6 is a flowchart for explaining a processing example of a relationship specifying unit.

FIG. 6 is a flowchart for explaining processing of the relationship specifying unit 64. The flowchart illustrated in FIG. 6 represents a subroutine of the process of step S190 in FIG. 5.

In steps S200, S280, and S290, one input variable V(r) changes from a minimum value min V(r) to a maximum value max V(r) in a predetermined interval const(r). The input variable V(r) is in advance registered and is referred to as registered input variable. The registered input variable is an input variable whose relationship with a response variable O(q) is desired to be quantified.

In steps S210, S220, S240, and S250, one input variable (Vsub(u)) of s input variables defined in advance is selected among the other input variables than V(r), Vsub(u) changes from a minimum value min Vsub(u) to a maximum value max Vsub(u) in a predetermined interval const(u).

In step S230, V(r) and Vsub(u) are input to the temporary model, and a relationship ML(u,q) between V(r) and Vsub(u) and O(q) is thereby acquired. At this point, when another input variable changing in response to Vsub(u) is present, this input variable is changed while the relationship with Vsub(u) is maintained. Note that in a case where plural O(q) are present, plural relationships ML are obtained.

Processes of steps S230 to S250 are performed for all main input variables Vsub(u) (a total of s) (steps S260 and S270).

Accordingly, in relationship between the registered input variable V(r) and the response variable O(q), the input-output relationship due to differences among the main input variables Vsub(u) (a total of s) is obtained as the numerical quantity data.

Figure 4:
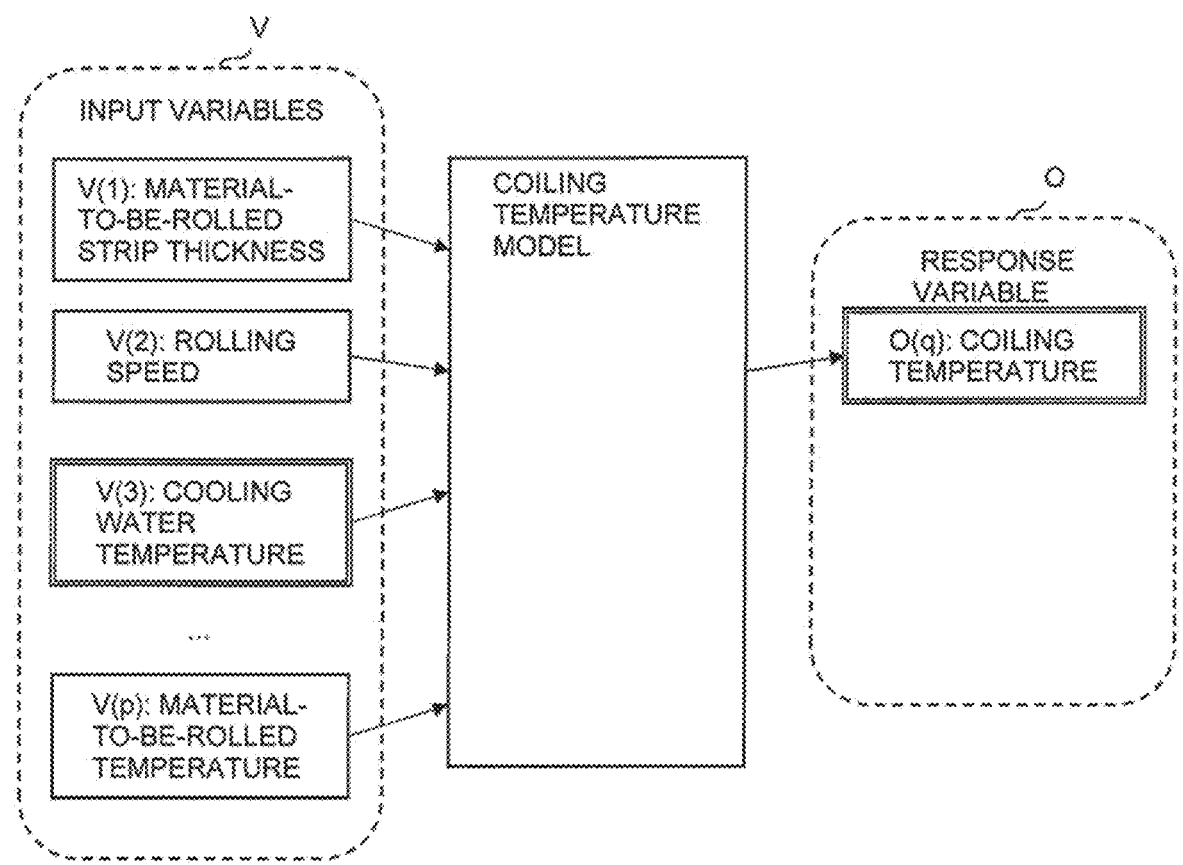
FIG. 4 is a diagram for explaining input variables and an output variable of a coiling temperature model of a rolling line.

In FIG. 6, for example, the registered input variable V(r) is the cooling water temperature, the main input variable Vsub(u) is a material-to-be-rolled strip thickness, and the response variable O(q) is the coiling temperature (FIG. 4).

In the routine of FIG. 6, in order to investigate the relationship between the cooling water temperature as the registered input variable V(r) and the coiling temperature as the response variable O(q), the relationship specifying unit 64 changes each of Vsub(u) as the material-to-be-rolled strip thickness and V(r) as the cooling water temperature from the minimum value to the maximum value in a predetermined interval and thereby calculates the output (coiling temperature) of the temporary model. In this case, because a relationship is present in which a rolling speed becomes lower as the material-to-be-rolled strip thickness becomes thicker, those input variables are input to the temporary model while this relationship is maintained. As a result, as illustrated in FIG. 7, with the material-to-be-rolled strip thickness (Vsub(u)) being a parameter, the relationship (ML) between the cooling water temperature (V(r)) and the coiling temperature (O(q)) is obtained.

Figure 7:
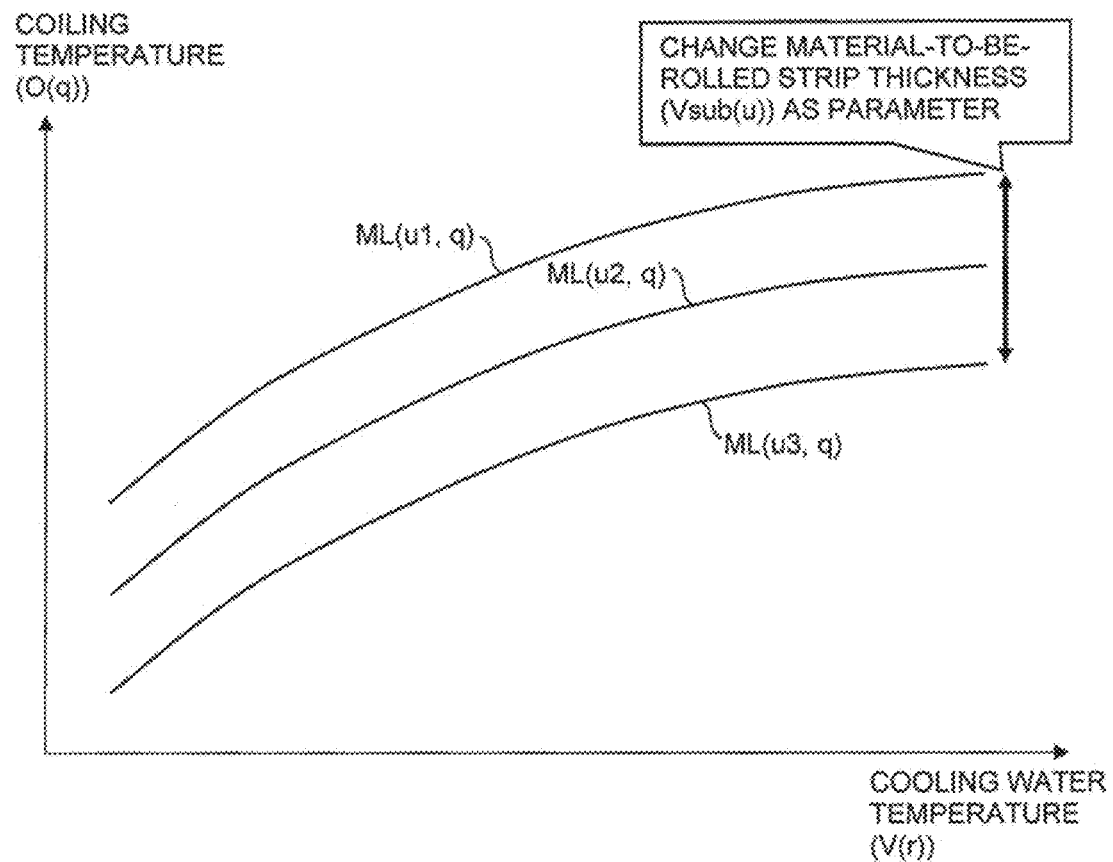
FIG. 7 is a graph illustrating a relationship (ML) between a cooling water temperature (V(r)) and a coiling temperature (O(q)).

By the routine of FIG. 6, the input-output relationship illustrated in FIG. 7 between the registered input variable and the response variable is quantified as the numerical quantity data. The numerical quantity data are a numerical value table describing the relationship between the registered input variable (cooling water temperature) and the response variable (coiling temperature) or a function such as a linear function, a quadratic function, a logarithmic function, or an exponential function that approximates the relationship.

FIG. 8 is a diagram illustrating one example of the numerical value table. The numerical value table illustrated in FIG. 8 indicates how the coiling temperature changes in accordance with the cooling water temperature, with respect to each combination of material-to-be-rolled type and material-to-be-rolled strip thickness. The material-to-be-rolled type is a steel grade in a case of steel rolling and is a product type in a case of aluminum rolling. In each field of the numerical value table, the value of the response variable O(q) corresponding to a condition is entered.

Next, the model coefficient identification unit 65 will be described.

Even if the numerical quantity data quantifying the relationship between the cooling water temperature and the coiling temperature are obtained by the relationship specifying unit 64 and the relationship between the cooling water temperature and the coiling temperature becomes clear, it is difficult to cause this relationship to be directly reflected in the practical model implemented in the calculator 4 (in a case where the relationship between the input variables and the response variable is expressed by a non-linear model as in formulas (1) to (4)).

The model coefficient identification unit 65 identifies the correction coefficient of the practical model such that the calculated values match the values of the response variable that are included in the numerical quantity data, the calculated values being outputs of the practical model in a case where the values of the registered input variable that are included in the numerical quantity data are set as inputs to the practical model. Note that the practical model provided in the model coefficient identification unit 65 is the same as the practical model implemented in the calculator 4.

Figure 9:
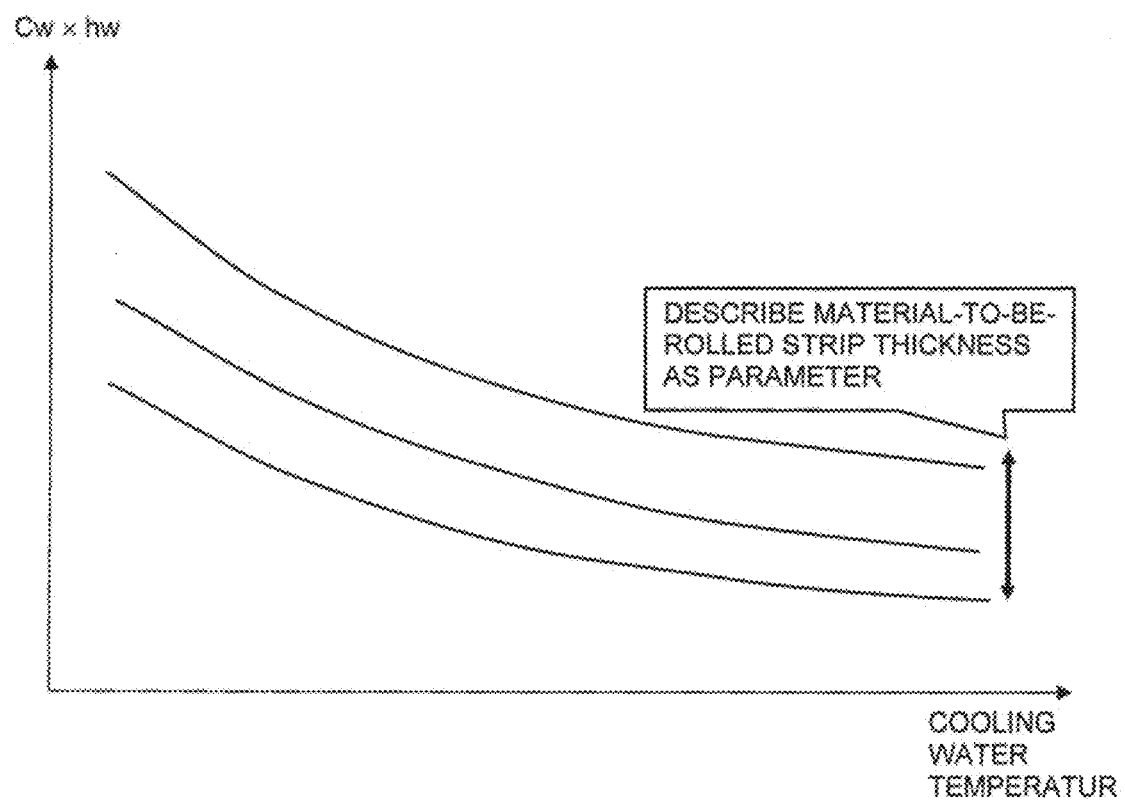
FIG. 9 is a graph illustrating the relationship between cooling temperature $T_W$ and water-cooling heat-transfer coefficient $h_W \times$correction coefficient $C_W$ in formula (4).

The model coefficient identification unit 65 gives the numerical quantity data (plural discrete values whose number is limited) to the practical model. For example, the material-to-be-rolled strip thickness and the cooling water temperature in the numerical value table of FIG. 8 which are set as inputs and the coiling temperature as an output are given to the practical model. In the practical model in which the relationship between the registered input variable and the response variable is non-linearly expressed as in formulas (1) to (4), the outputs of the practical model are calculated while the value of the registered input variable in the practical model is changed, and the correction coefficient $C_W$ (formula (4)) is obtained which causes those calculated values to match the values of the response variable which are defined in the numerical quantity data. FIG. 9 is a graph illustrating the relationship between cooling temperature $T_W$ and water-cooling heat-transfer coefficient $h_W \times$correction coefficient $C_W$ in formula (4).

The model coefficient setting unit 66 sets the identified correction coefficient for the practical model implemented in the calculator 4. For example, the model coefficient setting unit 66 transmits the correction coefficient to the calculator 4 and updates the correction coefficient $C_W$ of the practical model implemented in the calculator 4.

The identification result saving unit 67 newly saves a result of identification by the model coefficient identification unit 65 in a storage device 67a in addition to past results. The saved identification result is capable of being taken out in response to a request.

The display unit 68 is capable of displaying, as needed, processing contents of the data edition unit 61, the statistical model learning unit 62, the model validity verification unit 63, the relationship specifying unit 64, the model coefficient identification unit 65, the model coefficient setting unit 66, and the identification result saving unit 67.

As described in the foregoing, the physical model identification system according to this embodiment first uses the actual data (process data) sampled from the manufacturing line to learn the temporary model (statistical model) expressing the controlled object. Next, this system creates the numerical quantity data quantifying the input-output relationship between the registered input variable and the response variable of the learned temporary model. Next, this system identifies the correction coefficient of the practical model (physical model) such that the relationship, expressed by the numerical quantity data, between the registered input variable and the response variable is maintained. This system sets the identified correction coefficient for the practical model implemented in the calculator 4.

As described above, this system may improve precision of the practical model (physical model) implemented in the control system of the manufacturing line. Accordingly, prediction precision of the preset values and control values of the controlled object by the practical model is improved, and a stable operation of the manufacturing line and high quality production become possible.

Further, in feedback control in related art, that is, in control in which an output (control value) of the controlled object is fed back to the side of an input (target value) and a correction action is performed such that those two values match each other, precision of the practical model itself may not be enhanced. Thus, the prediction precision of the preset values by the practical model may not be enhanced. Compared to this, this system may enhance precision of the practical model itself. Thus, the prediction precision of the preset values by the practical model may be enhanced.

<Modification Examples>

Incidentally, in the system of the above-described first embodiment, a rolling line is described as the manufacturing line; however, the manufacturing line is not limited to this. For example, the manufacturing line may be a production line of paper manufacturing, a production line of a chemical plant, or a production line of foodstuffs.

Further, in the system of the above-described first embodiment, the coiling temperature model is described; however, a model is not limited to this. For example, in a roll force model, a roll force in a rolling mill may be set as the response variable, and the material-to-be-rolled strip thickness before and after rolling, the rolling speed, a material-to-be-rolled temperature, a chemical component of the material-to-be-rolled, and so forth may be set as the input variables. Further, the coiling temperature model is extended to a temperature model, the coiling temperature and a finishing mill delivery-side temperature may be included in the response variables.

Further, in the system of the above-described first embodiment, a description is made about a case where one registered input variable V(r) is present in creation of the numerical quantity data; however, two or more registered input variables V(r) may be present. The processing of the flowchart of FIG. 6 may be repeated for each of plural registered input variables V(r).

Further, in the system of the above-described first embodiment, a description is made about a case where the controlled object is expressed by a non-linear model; however, a linear model may be used. In a case where the relationship between the registered input variable and the response variable in the practical model is expressed by a linear function, the model coefficient identification unit 65 obtains a correction coefficient which causes the calculated values of the input variable calculated by an inverse function to match the values of the input variable which are defined in the numerical quantity data.

<Hardware Configuration Example>

Figure 10:
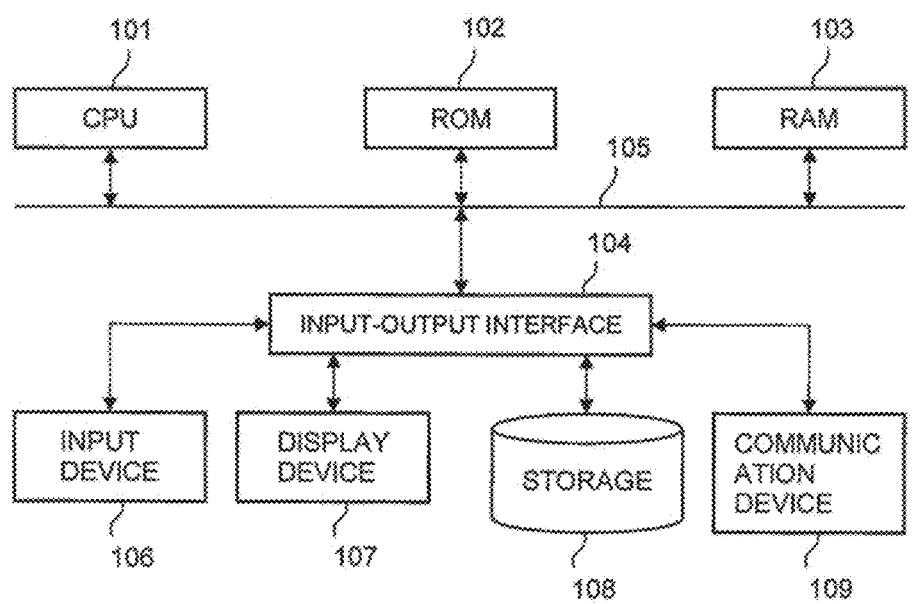
FIG. 10 is a block diagram illustrating a hardware configuration example of a processing circuit provided in a physical model identification device.

FIG. 10 is a block diagram illustrating a hardware configuration example of a processing circuit provided in the physical model identification device 6 according to the first embodiment. Each portion of the physical model identification device 6 illustrated in FIG. 2 indicates a portion of functions provided in the device, and each function is realized by the processing circuit. For example, the processing unit is a computer including a CPU (central processing unit) 101, a ROM (read-only memory) 102, a RAM (random access memory) 103, an input-output interface 104, a system bus 105, an input device 106, a display device 107, a storage 108, and a communication device 109.

The CPU 101 is a processing device executing various kinds of computation processes by using programs, data, and so forth stored in the ROM 102 and the RAM 103. The ROM 102 is a read-only storage device storing a basic program, environment files, and so forth for causing the computer to realize each function. The RAM 103 is a main storage device storing programs executed by the CPU 101 and data necessary for execution of each program and is capable of high speed read-out and writing. The input-output interface 104 is a device mediating connection between various kinds of hardware and the system bus 105. The system bus 105 is an information transmission path shared by the CPU 101, the ROM 102, the RAM 103, and the input-output interface 104.

Further, hardware such as the input device 106, the display device 107, the storage 108, and the communication device 109 is connected with the input-output interface 104. The input device 106 is a device processing inputs from a user. The display device 107 is a device displaying a state and so forth of the system. The storage 108 is a large-capacity auxiliary storage device storing programs and data and is a hard disk device, a non-volatile semiconductor memory, or the like, for example. The communication device 109 is a device capable of data communication with an external device in a wired or wireless manner.

Note that the calculator 4 and the data sampling device 5 have processing circuits equivalent to the above-described physical model identification device 6.

In the foregoing, the embodiments of the present invention have been described; however, the present invention is not limited to the above embodiments but may be carried out while being variously modified without departing from the scope of the gist of the present invention.

REFERENCE SIGNS LIST

1 rolling line
2 material-to-be-rolled
3 physical model identification system
4 calculator
5 data sampling device
5*a* recording device
6 physical model identification device
21 heating furnace
22 roughing mill
23 edge heater
24 finishing mill
25 run-out table
26 coiler
27 finishing mill entry-side pyrometer
28 strip thickness meter
29 strip width meter
30 finishing mill delivery-side pyrometer
31 coiler entry-side pyrometer
61 data edition unit
62 statistical model learning unit
63 model validity verification unit
64 relationship specifying unit
65 model coefficient identification unit
66 model coefficient setting unit
67 identification result saving unit
67*a* storage device
68 display unit
101 CPU
102 ROM
103 RAM
104 input-output interface
105 system bus
106 input device
107 display device
108 storage
109 communication device

The invention claimed is:

1. A physical model identification system comprising:
a calculator calculating a preset value and a control value, the preset value and the control value being applied to a controlled object, by using a physical model expressing a physical phenomenon in the controlled object including a manufacturing facility and a manufacturing process by a mathematical formula;
a data sampling device sampling plural sets of process data as control results of the controlled object based on the preset value and the control value, the preset value and the control value being calculated by the calculator;
a physical model identification device identifying the physical model based on the plural sets of process data; and
a controller that applies the physical model identified by the physical model identification device to control operations of the manufacturing facility or the manufacturing process performed by the manufacturing facility;
wherein the physical model expresses an input-output relationship between plural input variables and at least one response variable by a mathematical formula including a correction coefficient,
wherein each of the plural sets of process data includes values of the plural input variables and values of the response variable, and
wherein the physical model identification device has:
a data edition unit separating remaining data resulting from removal of abnormal data from the plural sets of sampled process data into data for learning and data for verification;
a statistical model learning unit using the data for learning to inductively learn a statistical model expressing the input-output relationship between the plural input variables and the response variable for the controlled object;
a model validity verification unit verifying validity of the learned statistical model by using the data for verification;
a relationship specifying unit using the learned statistical model to create numerical quantity data quantifying an input-output relationship between at least one registered input variable included in the plural input variables and the response variable in a case where the learned statistical model is valid;
a model coefficient identification unit identifying the correction coefficient of the physical model such that calculated values match values of the response variable which are included in the numerical quantity data, the calculated values being outputs of the physical model in a case where values of the registered input variable which are included in the numerical quantity data are set as inputs to the physical model; and
a model coefficient setting unit setting the identified correction coefficient for the physical model implemented in the calculator.

2. The physical model identification system according to claim 1, wherein the statistical model is a model expressing a function showing the input-output relationship between the plural input variables and the response variable by using a method of least squares or a model expressing the input-output relationship by using machine learning.

3. The physical model identification system according to claim 1, wherein the abnormal data are process data in which a value of at least one of the input variables does not fluctuate among the plural sets of continuous process data or are process data in which at least one input variable fluctuates a threshold value or more among the plural sets of continuous process data.

4. The physical model identification system according to claim 1, wherein
the learned statistical model is determined to be valid in a case where a difference between
an error A between a calculated value of the response variable, the calculated value being output in a case where a value of the input variable, the value being included in the data for learning, is input to the learned statistical model, and an actual value of the response variable, the actual value being included in the data for learning and
an error B between a calculated value of the response variable, the calculated value being output in a case where a value of the input variable, the value being included in the data for verification, is input to the learned statistical model, and an actual value of the response variable, the actual value being included in the data for verification
is within a threshold value.

5. The physical model identification system according to claim 1, wherein
the numerical quantity data are a numerical value table describing a relationship between the registered input variable and the response variable or a function approximating the relationship.

* * * * *